United States Patent [19]

Sugiyama

[11] Patent Number: 5,251,020
[45] Date of Patent: Oct. 5, 1993

[54] COLOR IMAGE COMMUNICATION APPARATUS CAPABLE OF TRANSMITTING OR RECEIVING A COLOR EXPRESSION FORM

[75] Inventor: Mitsumasa Sugiyama, Kawasaki, Japan

[73] Assignee: Canon Kabushiki Kaisha, Tokyo, Japan

[21] Appl. No.: 795,802

[22] Filed: Nov. 21, 1991

[30] Foreign Application Priority Data

Nov. 21, 1990 [JP] Japan ................................ 2-318976
Nov. 21, 1990 [JP] Japan ................................ 2-318977
Nov. 21, 1990 [JP] Japan ................................ 2-318985

[51] Int. Cl.⁵ .............................................. H04N 1/46
[52] U.S. Cl. .................................... 358/500; 358/527
[58] Field of Search ............................ 358/75–80, 358/434–439

[56] References Cited

U.S. PATENT DOCUMENTS

| | | | |
|---|---|---|---|
| 4,862,254 | 8/1989 | Takada | 358/434 |
| 4,862,282 | 8/1989 | Nakajima | 358/434 |
| 4,887,151 | 12/1989 | Wataya | 358/80 |
| 4,992,861 | 2/1991 | D'Errico | 358/80 |
| 5,018,008 | 5/1991 | Asada | 358/80 |
| 5,073,818 | 12/1991 | Iida | 358/80 |

FOREIGN PATENT DOCUMENTS

| | | |
|---|---|---|
| 0283715 | 9/1988 | European Pat. Off. . |
| 3335675 | 5/1985 | Fed. Rep. of Germany . |
| 3505368 | 8/1986 | Fed. Rep. of Germany . |
| 2132971 | 5/1990 | Japan . |

OTHER PUBLICATIONS

"Fax: Digital Facsimile Technologies & Applications" Kenneth R. McConnell et al. Artech House, 1989, pp. 41–49, 154–160.

Primary Examiner—Stephen Brinich
Attorney, Agent, or Firm—Fitzpatrick, Cella, Harper & Scinto

[57] ABSTRACT

A color image communication apparatus includes a first circuit for receiving color image data through a communication line from an image transmitter, and a second circuit for transmitting data representing a compatible color expression form through the communication line to the image transmitter.

19 Claims, 8 Drawing Sheets

FIG. 1
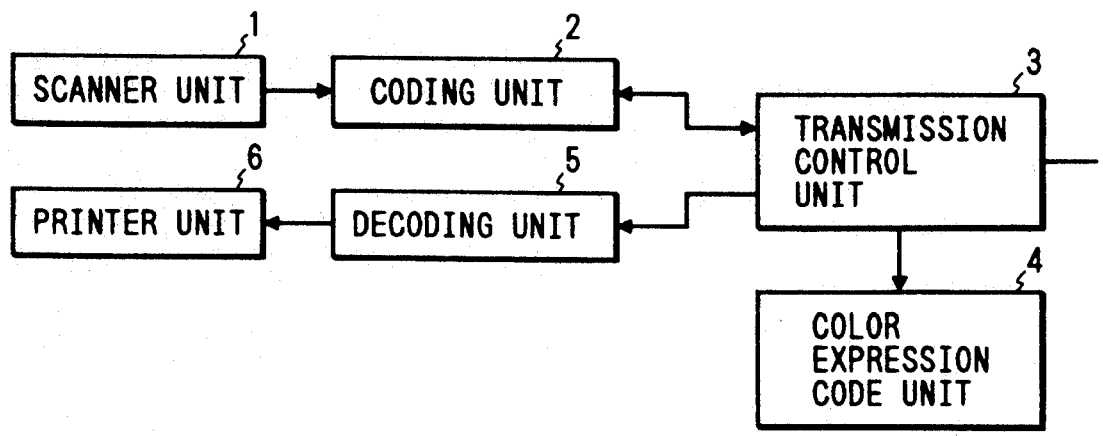
FIG. 2
| CODE | COLOR EXPRESSION |
|------|------------------|
| 0 0 0 1 | X Y Z |
| 0 0 1 0 | R G B |
| 0 1 0 0 | c m y |
FIG. 3
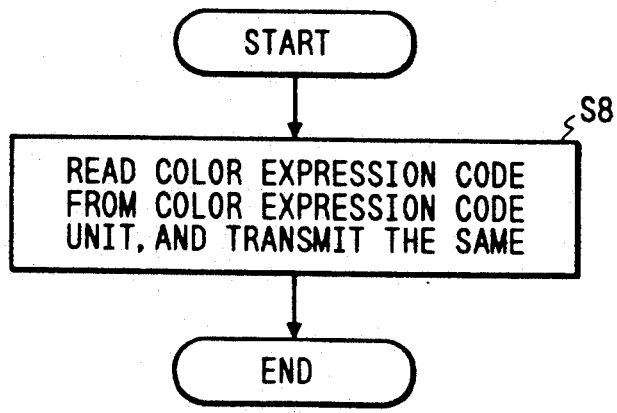

COLOR IMAGE COMMUNICATION APPARATUS CAPABLE OF TRANSMITTING OR RECEIVING A COLOR EXPRESSION FORM

BACKGROUND OF THE INVENTION

1. Field of the Invention

The present invention relates to a color image communication apparatus.

2. Related Background Art

Color image communication apparatuses, i.e., color facsimile apparatuses, for communicating a color image have been studied. However, a standard color image expression form has not been established because various color image expression forms such as RGB, XYZ, L*a*b*, cmy, and cmyk forms are available.

For this reason, color image data converted into RGB data by a transmitter, for example, may be printed at a receiver which assumes the transmission data as cmy data, and appropriate color image communication cannot be performed. That is, color image data are transmitted between the transmitter and receiver in accordance with different color expression forms. As a result, appropriate color image communication cannot often be performed.

SUMMARY OF THE INVENTION

It is an object of the present invention to provide a color image communication system which can solve the conventional problems described above.

It is another object of the present invention to provide a color image communication apparatus suitable for a digital network.

It is still another object of the present invention to provide a color image communication apparatus capable of transmitting a color image with high precision.

In order to achieve the above objects, according to an aspect of the present invention, there is provided a color image communication apparatus comprising means for receiving data representing a compatible color expression form from a destination unit and means for controlling a color expression form of transmission image data in accordance with the received data representing the color expression form.

It is still another object of the present invention to provide a color image communication apparatus which can provide a new protocol.

It is still another object of the present invention to provide a color image communication apparatus suitable for an ADCT scheme.

The above and other objects, features, and advantages of the present invention will be apparent from the following detailed description of the preferred embodiments in conjunction with the accompanying drawings.

BRIEF DESCRIPTION OF THE DRAWINGS

FIG. 1 is a block diagram of an embodiment of the present invention;

FIG. 2 is a table showing codes corresponding to color expression forms;

FIG. 3 is a flow chart showing an operation of a transmission control unit shown in FIG. 1;

DETAILED DESCRIPTION OF THE PREFERRED EMBODIMENTS

First Embodiment

Figure 4:
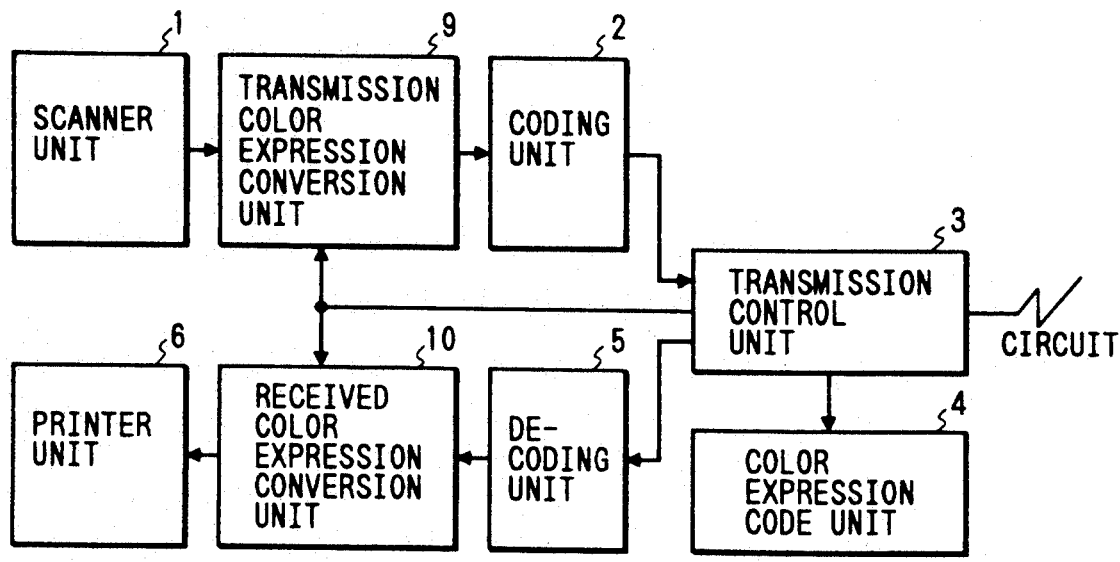
FIG. 4 is a block diagram of another embodiment of the present invention.

FIG. 1 is a block diagram showing an arrangement of an embodiment according to the present invention. An apparatus of this embodiment includes a scanner unit serving as a color image input unit, a coding unit 2 for performing coding of input image data, a transmission control unit 3 which communicates with another color image communication apparatus, a color expression code unit 4 for storing a code representing a color expression form, a decode unit 5 for decoding coded data, and a printer unit 6.

In color image transmission, a color image is read by the scanner unit 1, and the scanner unit 1 sends each pixel as 8-bit RGB data to the coding unit 2.

The coding unit 2 performs known coding such as MR or MMR and sends coded data to the transmission control unit 3. The transmission control unit 3 reads a color expression code representing an RGB color expression form from the color expression code unit 4 and sends the color expression code to a receiver. The transmission control unit 3 transmits image data. In this embodiment, the color image is expressed and transmitted as RGB data. Therefore, an RGB color expression code is transmitted.

FIG. 2 shows codes respectively corresponding to color expressions. That is, the codes are assigned to XYZ, RGB, and cmy color expression forms, respectively. Assignment of each code to each color expression is predetermined in common to the transmitter and receiver. For example, when the receiver receives a color expression code of "0001", it can identify it as the XYZ color expression form.

The color expression code can be transmitted as an initial identification signal in the nonstandard function, e.g., an NSF signal if the receiver is an image communication apparatus complying with the G3 facsimile standard. If the receiver is an image communication apparatus complying with the G4 facsimile standard, the color expression code can be transmitted as a user•user signal described in layer specification 4.5.24, ISDN network interface No. 3, TTC recommendations. That is, a specific 4-bit signal is converted into a color expression code to send the color expression form to the receiver. In this case, the receiver identifies a color expression form using the specific 4-bit signal.

FIG. 3 is a flow chart showing a transmission operation of a color expression code in the transmission control unit 3. In step S8, a color expression code from the color expression code unit 4 is read, and the read code is transmitted.

On the other hand, in color image reception, after the transmission control unit 3 communicates with the transmitter, the transmission control unit 3 reads the color expression code from the color expression code unit 4 and sends out this code. Thereafter, the transmission control unit 3 receives color image data and decodes it. The decoded color image data is sent to the printer unit 6. The color image data is printed at the printer unit 6. In this embodiment, the printer unit 6 receives RGB data and prints it.

In this embodiment, in color image transmission or reception, a color expression code is transmitted to notify the color expression form to the receiver and transmitter, thereby allowing optimal color image communication.

Second Embodiment

The apparatus of the first embodiment has both the transmission and reception functions. However, an apparatus of the present invention may have only a reception or transmission function.

Third Embodiment

FIG. 4 is a block diagram showing an arrangement having a transmission color expression conversion unit 9 and a received color expression conversion unit 10 to allow color conversion in transmission and reception modes in accordance with the types of receiver and transmitter.

Figure 5:
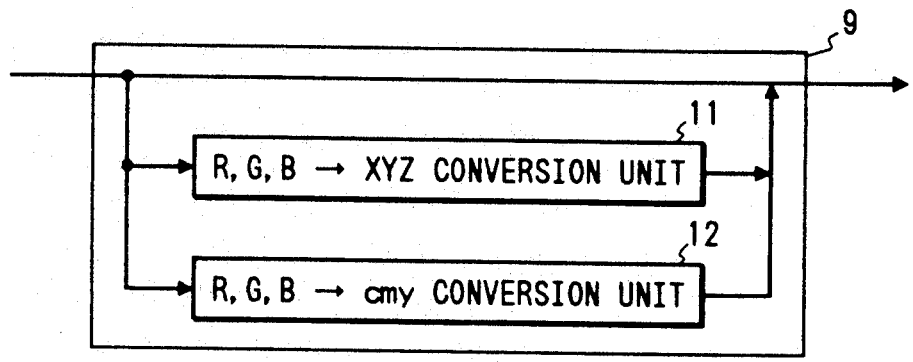
FIG. 5 is a block diagram of a transmission color expression conversion unit shown in FIG. 4.

FIG. 5 is a block diagram showing an arrangement of the transmission color expression conversion unit 9 shown in FIG. 4. An R.G.B→XYZ conversion unit 11 converts RGB data into XYZ→data. An R.G.B-cmy conversion unit 12 converts RGB data into cmy data. These conversion operations are performed by arithmetic operations in accordance with known conversion schemes. The transmission color expression conversion unit 9 can transmit to a coding unit 2 the RGB data input from a scanner unit 1 or XYZ or cmy data converted from the RGB data.

Figure 6:
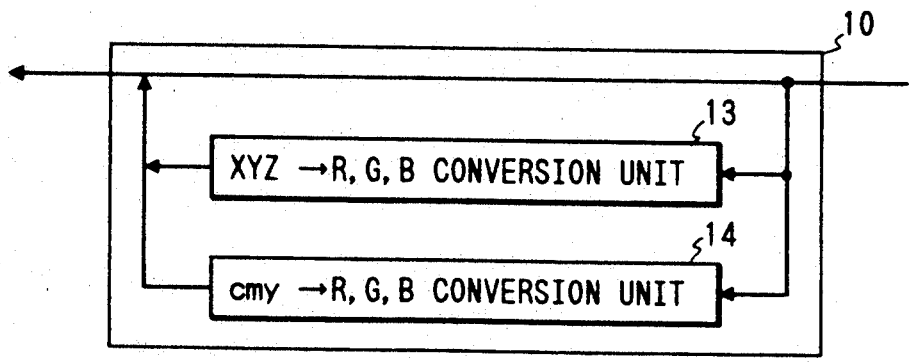
FIG. 6 is a block diagram of a received color expression conversion unit shown in FIG. 4.

FIG. 6 is a block diagram showing an arrangement of the received color expression conversion unit 10 shown in FIG. 4. Referring to FIG. 6, an XYZ→R.G.B conversion unit 13 converts XYZ data into RGB data compatible with a printer unit 6 when color image data sent from a decode unit 5 is XYZ data. A cmy→R.G.B conversion unit 14 converts cmy data into RGB data when the input color image data is cmy data. The received color expression conversion unit 10 transmits RGB data to the printer unit 6 when the input color image data is RGB data. However, when the input color image data is XYZ or cmy data, the received color expression conversion unit 10 converts it into RGB data and transmits the RGB data to the printer unit 6. These conversion operations are also performed by arithmetic operations.

Figure 7:
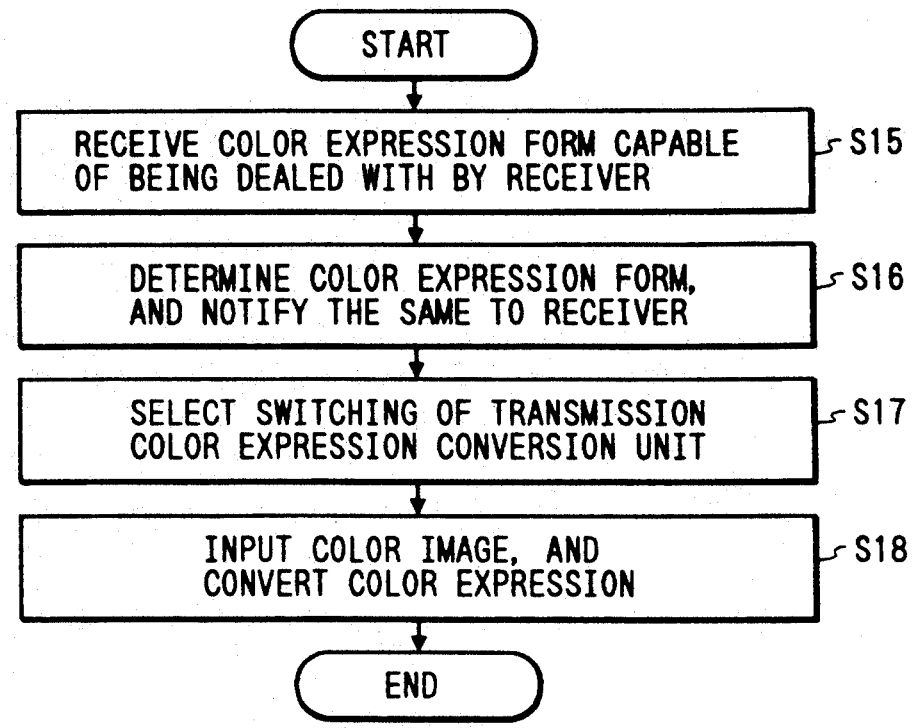
FIG. 7 is a flow chart showing operations of the transmission color expression conversion unit and the transmission control unit shown in FIG. 4.

FIG. 7 is a flow chart showing operations of a transmission control unit 3 and the transmission color expression conversion unit 9 in FIG. 4 in the transmission mode. In step S15, a color expression form capable of being dealt with by the receiver is received. In step S16, the color expression form used in transmission is determined, and the determined color expression form is notified to the receiver. In step S17, switching of the transmission color expression conversion unit is selected. In step S18, a color image is input, and the color expression form is converted. The data obtained upon color expression conversion is coded by the coding unit 2, and the coded data is transmitted from the transmission control unit 3 to the receiver through a circuit.

Figure 8:
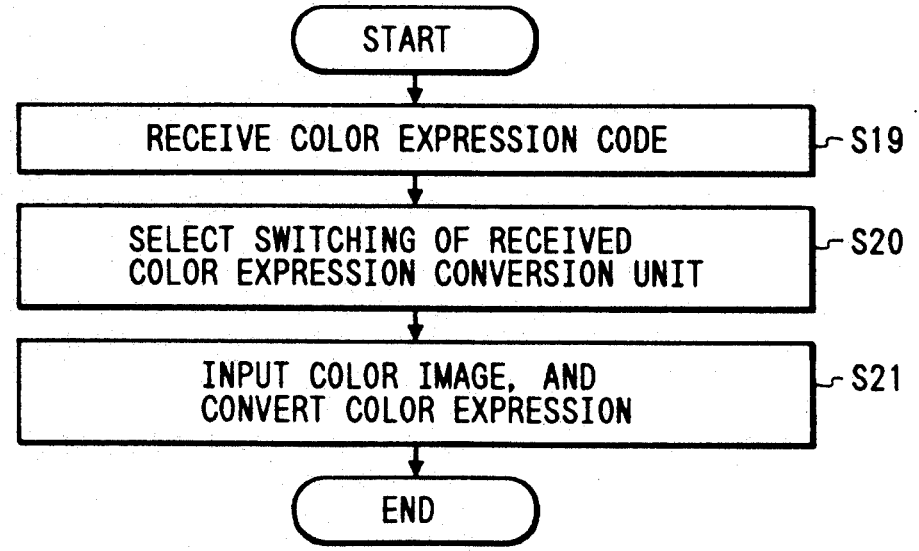
FIG. 8 is a flow chart showing operations of the received color expression conversion unit and the transmission control unit shown in FIG. 4.

FIG. 8 is a flow chart showing operations of the transmission control unit 3 and the received color expression conversion unit 10. In step S19, a color expression code is received. In step S20, switching of the received color expression conversion unit 10 is selected. In step S21, color image data is input, and the image data decoded by the decode unit 5 is subjected to the color expression conversion. The resultant data is transmitted to the printer unit 6.

In this embodiment, color expression conversion is performed in accordance with the types of receiver and transmitter in transmission and reception modes, thereby performing optimal color image communication.

Fourth Embodiment

The third embodiment exemplifies an apparatus capable of performing both transmission and reception. However, a color image communication apparatus may have only a transmission or reception function.

Fifth Embodiment

In each of the above embodiments, the color image input unit comprises a scanner. However, the color image input unit may be a television camera, an electronic camera, or any other color image input unit. In addition, color image data may be input from a color image data base.

Sixth Embodiment

Each of the above embodiments comprises a printer unit. However, an output device may be a CRT or any other output device. In addition, the output device may be a storage unit such as a disc.

Seventh Embodiment

Figure 9:
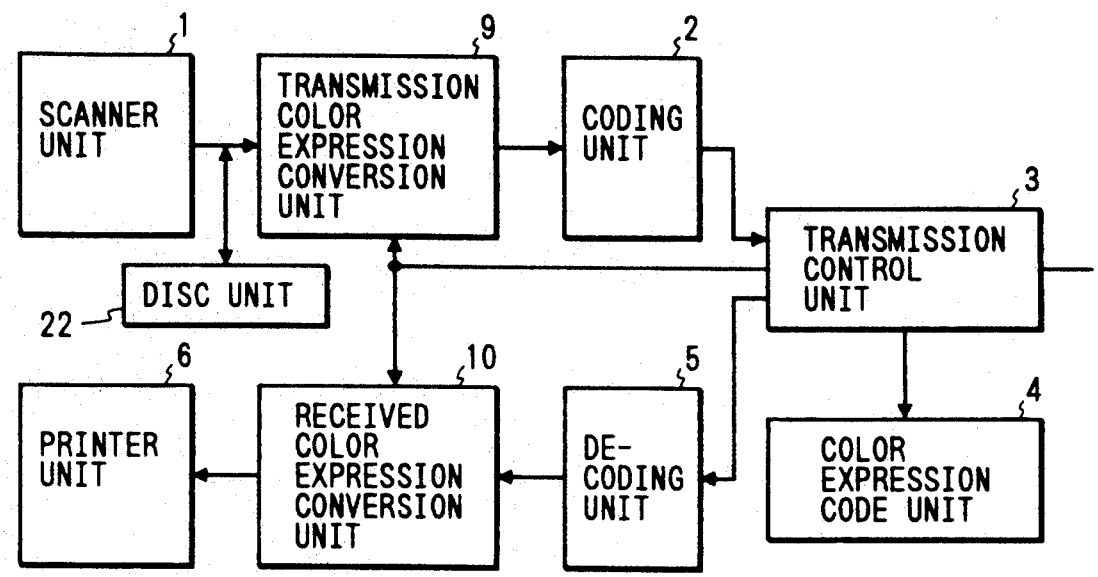
FIGS. 9 and 10 are block diagrams of other embodiments of the present invention.

This embodiment shown in FIG. 9 exemplifies an arrangement wherein color image data output from a scanner unit 1 is temporarily stored in a disc unit 22. In this embodiment, a color image is read by the scanner unit 1, and the read color image is stored in the disc unit 22. A transmission control unit 3 communicates with a receiver to determine a color expression form. The color image data is read out from the disc and converted by a transmission color expression conversion unit 9 as needed. The converted data is then transmitted. When an image of one original is to be transmitted to a plurality of destinations, color image data is read out from the disc, and the color expression form data can be converted in accordance with the destinations, thereby requiring one read access.

Eighth Embodiment

Figure 10:
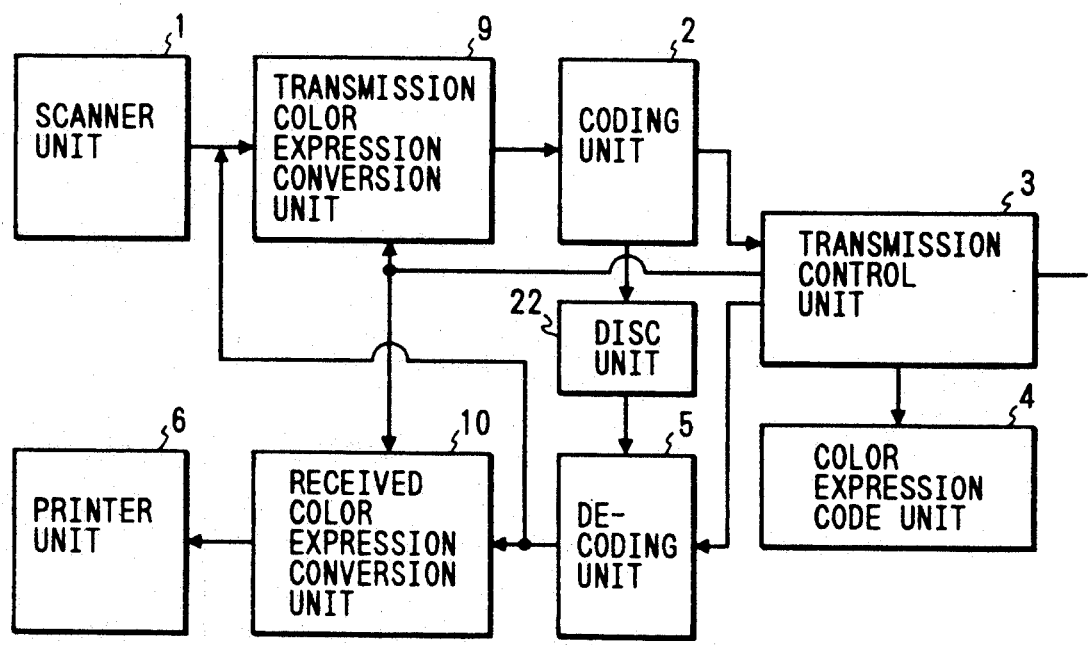

FIG. 10 is still another embodiment in which color image data to be stored in a disc unit 22 is given as coded data in the seventh embodiment. In order to perform color expression conversion, color expression conversion is required after decoding. By decoding, the capacity of the color image data stored in the disc unit 22 can be reduced.

In this embodiment, codes are assigned to RGB, XYZ, and cmy as color expression forms. However, other color expression forms such as YIQ, YCrCb, L*a*b*, Luv, and Munsell system may be used. In addition, color expression forms may be further classified into the RGB system of the CIE scheme and the RGB system of the NTSC scheme. Furthermore, cmyk forms may be further classified into an SWOP (Standard Web Offset Publications) cmyk form and cmyk forms unique to the respective printers.

An arrangement of the transmission control unit 3 will be described with reference to FIG. 11.

Figure 11:
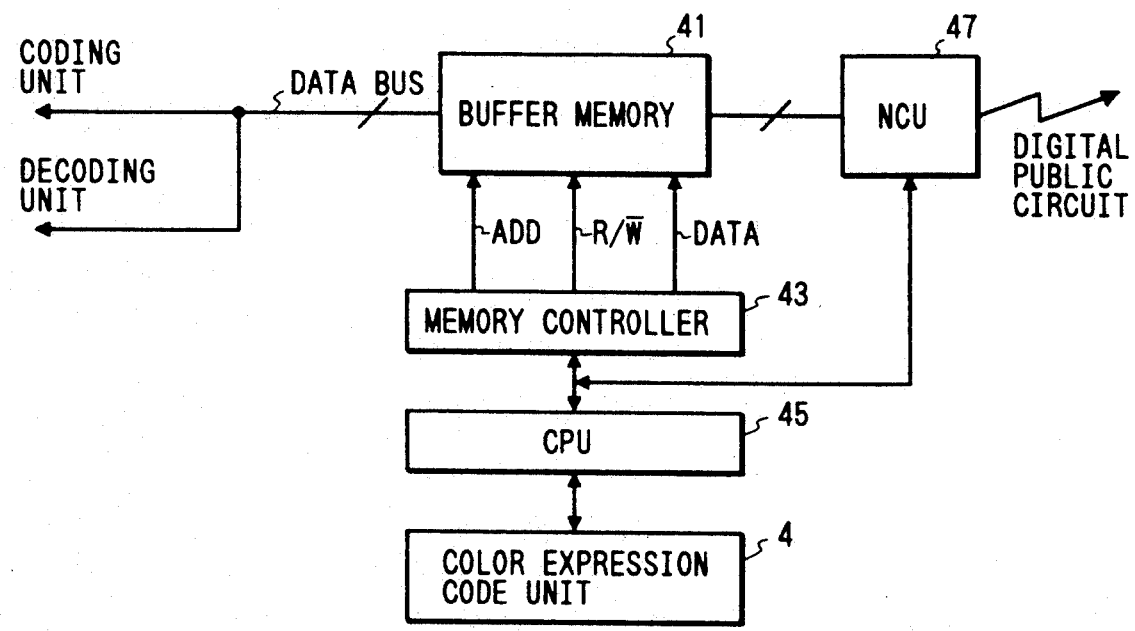
FIG. 11 is a block diagram showing an arrangement of a transmission control unit 3.

Referring to FIG. 11, the transmission control unit 3 includes a buffer memory 41 connected to a coding unit 2 and a decoding unit 5 through a data bus. The buffer memory 41 comprises a so-called dual port memory capable of performing read/write access of data from a memory controller 43 (to be described later) without going through the data bus. The memory controller 43 performs read/write access of the data to the buffer memory 41. The memory controller 43 has an Add line for addressing the buffer memory 41, an R/$\overline{W}$0 line for controlling read/write access to the buffer memory 41, and a data line for read/write access to the buffer memory 41. A CPU 45 controls the memory controller 43. The memory controller 43, the transmission color expression conversion unit 9, and the received color expression conversion unit 10 are operated in accordance with the flow charts described above. An NCU (Network Control Unit) 47 connects the buffer memory 41 to the digital public circuit to interface with the digital public circuit.

In step S8 of the flow chart in FIG. 3, in reading and sending a color expression code, the CPU 45 reads out this color expression code from the color expression code unit, writes the color expression code in the buffer memory 41 through the memory controller 43, and sets the buffer memory 41 in the read mode. At the same time, the CPU 45 sends a transmission instruction to the NCU 47. Therefore, the color expression code can be sent to the destination through the digital public circuit.

The operation in step S15 of the flow chart in FIG. 7 can be performed in a reverse order.

A color expression conversion method in the transmission color expression conversion unit 9 and the received color expression conversion unit 10 in the above embodiment will be described below.

In this color expression conversion, each color expression method is converted on the basis of the XYZ form standardized in the CIE system.

A relationship between XYZ and CIE-RGB will be defined as follows:

$$X = 0.49R + 0.31G + 0.20B \atop Y = 0.17697R + 0.81240G + 0.01063B \atop Z = 0.00R + 0.01G + 0.99B \quad (1)$$

A relationship between L*a*b* and XYZ is defined as follows. If the standard white is given as $(X_0, Y_1, Z_0)$, the L*a*b* of a given color $(X, Y, Z)$ is given as follows:

$$L^* = 116(Y/Y_0)^{\frac{1}{3}} - 16 \atop L^* = 903.3(Y/Y_0) \atop a^* = 500[(X/X_0)^{\frac{1}{3}} - (Y/Y_0)^{\frac{1}{3}}] \atop b^* = 200[(Y/Y_0)^{\frac{1}{3}} - (Z/Z_0)^{\frac{1}{3}}] \atop Y/Y_0 > 0.008856 \atop Y/Y_0 \leq 0.008856 \quad (2)$$

A relationship between XYZ and NTSC-RGB is defined as follows:

$$R = 1.9106X - 0.5326Y - 0.2883Z \atop G = -0.9843X + 1.9984Y - 0.0283Z \atop B = 0.0584X - 0.1185Y + 0.8985Z \quad (3)$$

A relationship between L*u*v* and XYZ is defined as follows. When the reference white is given as $(X_0, Y_0, Z_0)$, the L*u*v* of a given color $(X,Y,Z)$ is given as follows:

$$L^* = 116(Y/Y_0)^{\frac{1}{3}} - 16 \atop u^* = 13L^*(u' - u_0') \atop v^* = 13L^*(v' - v_0') \atop \text{for} \atop u' = \frac{4X}{X + 15Y + 3Z} \atop v' = \frac{9Y}{X + 15Y + 3Z} \atop u_0' = \frac{4X_0}{X_0 + 15Y_0 + 3Z_0} \atop v_0' = \frac{9Y_0}{X_0 + 15Y_0 + 3Z_0} \quad (4)$$

A relationship between YIQ and NTSC-RGB is defined as follows:

$$Y = 0.30R + 0.59G + 0.11B \atop I = 0.60R - 0.28G - 0.32B \atop Q = 0.21R - 0.52G + 0.31B \quad (5)$$

The color expression method is converted in accordance with equations (1) to (5) described above.

The arrangement of the coding unit 2 of this embodiment will be described with reference to FIG. 12.

Figure 12:
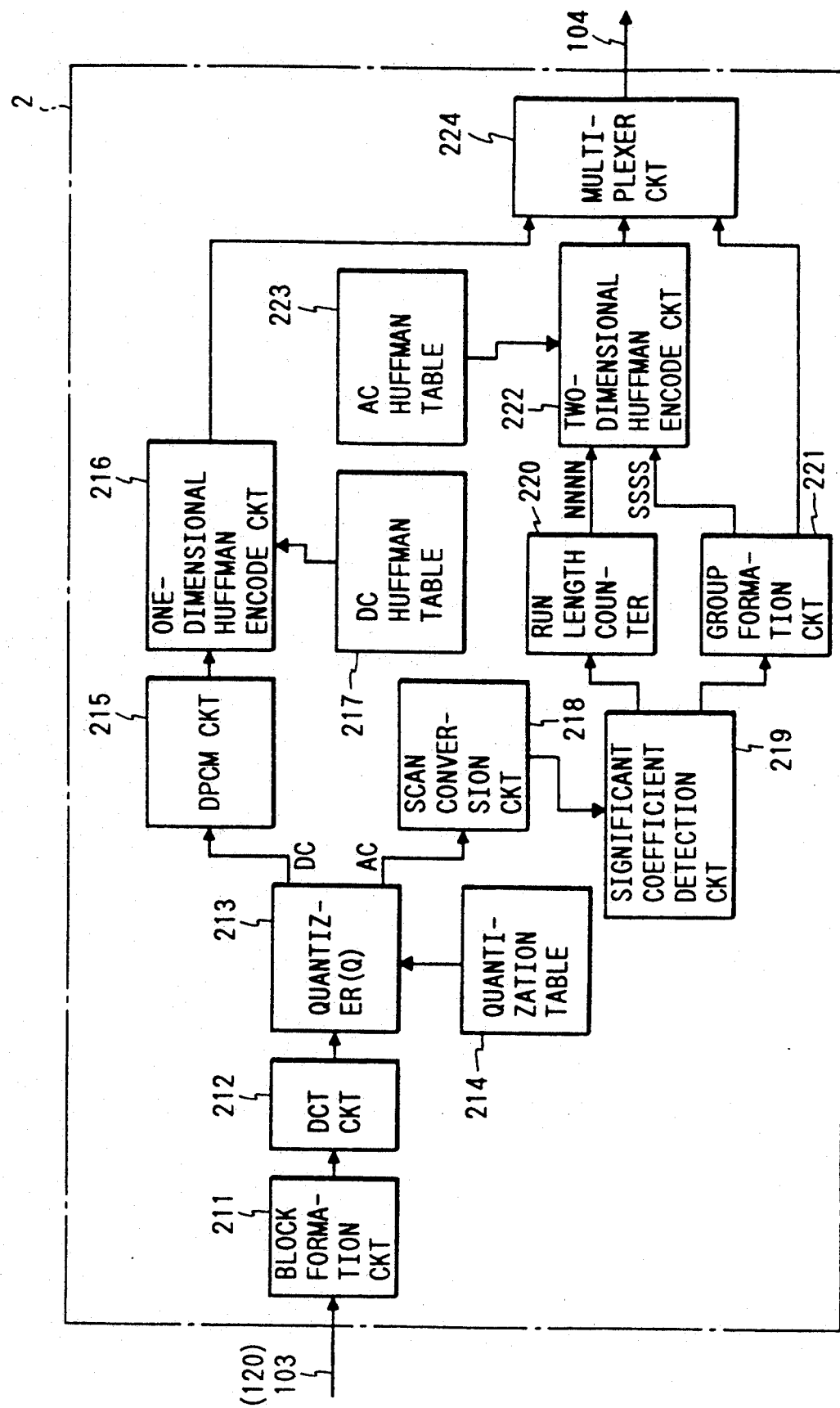
FIG. 12 is a block diagram showing an arrangement of a coding unit 2.

FIG. 12 is a block diagram showing a detailed arrangement of the coding unit 2. This embodiment exemplifies a coding unit of a baseline system as an international standard proposal of color still image coding proposed by JPEG (Joint Photographic Expert Group) as a joint group of the ISO and the CCITT.

Figure 13:
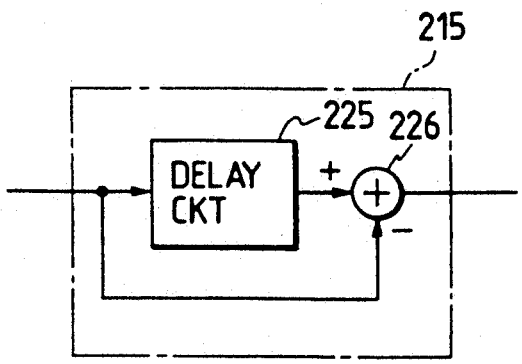
FIG. 13 is a block diagram showing an arrangement of a DPCM circuit shown in FIG. 12.

Image data in units of pixels input from a signal line 103 is extracted as 8×8 pixel blocks in a block formation circuit 211 constituted by a line memory capable of storing data of a few lines. The image data is cosine-converted by a discrete cosine conversion (DCT) circuit 212, and a conversion coefficient is supplied to a quantizer (Q) 213. The quantizer 213 performs linear quantization of the conversion coefficient in accordance with quantization step information applied from a quantization table 214. For example, the conversion coefficient is divided by a quantization step value. Of the quantized coefficients, a DC coefficient is subtracted from the DC component of the previous block by a predictive coding (DPCM) circuit 215 to obtain the difference (predictive error). The difference is supplied to a one-dimensional Huffman encode circuit 216. FIG. 13 is a detailed block diagram of the DPCM circuit 215. The DC coefficient quantized by the quantizer 213 is applied to a delay circuit 225 and a subtracter 226. The delay circuit 225 delays the DC coefficient by a time required to cause the DCT circuit 212 to calculate one block, i.e., $8 \times 8$ pixels. The DC coefficient of the previous block is therefore supplied from the delay circuit 225 to the subtracter 226. The difference (predictive error) appears at the output of the subtracter 226 (in this embodiment, since the previous block value is used as a predictive value in the predictive coding, a predictive unit is constituted by the delay circuit as described above).

The Huffman encode circuit 216 encodes the predictive error signal from the DPCM circuit 215 into variable length data in accordance with a DC Huffman code table 217, thereby supplying a DC Huffman code to a multiplexer circuit 224.

Figure 14A:
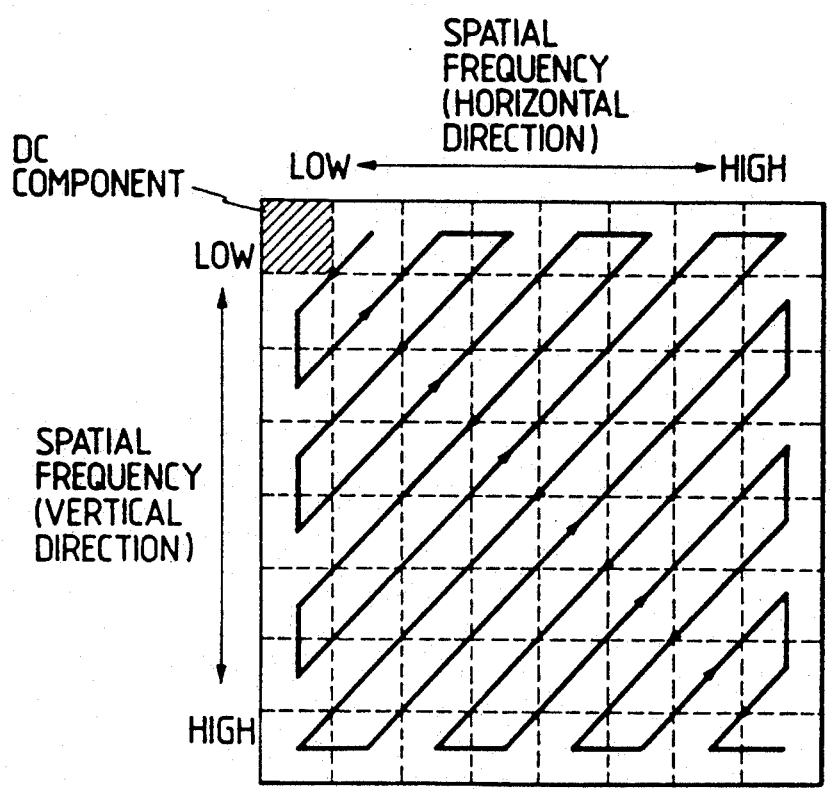
FIGS. 14A and 14B are diagrams for explaining an operation of the arrangement shown in FIG. 12.
Figure 14B:
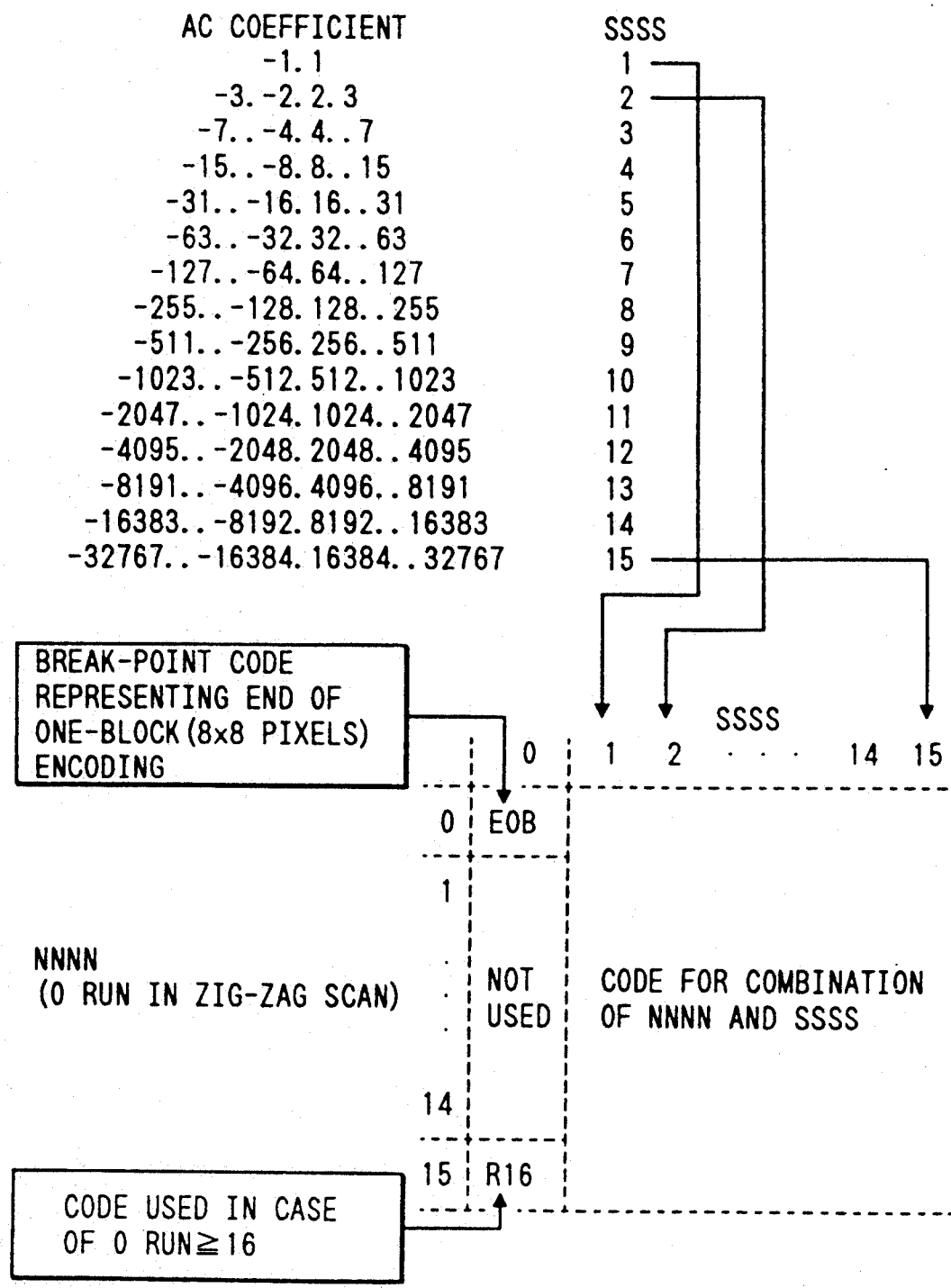

On the other hand, AC coefficients (coefficients except for the DC coefficient) quantized by the quantizer 213 are scanned by a scan conversion circuit 218 in a zig-zag manner in the order of lower coefficients, as shown in FIG. 14A. The scanned coefficients are supplied to a significant coefficient detection circuit 219. The significant coefficient detection circuit 219 determines whether the quantized AC coefficients are "0". If so, the significant coefficient detection circuit 219 supplies a count-up signal to a run length counter 220 to increment the counter value by one. However, if the AC coefficient quantized by the quantizer 213 has a value except for "0", the significant coefficient detection circuit 219 supplies a reset signal to the run length counter 220, thereby resetting the counter value. At the same time, the coefficient is divided into a group number SSSS and an additional bit by a group formation circuit 221, as shown in FIG. 14B. The group number SSSS is supplied to a two-dimensional Huffman encode circuit 222, and the additional bit is supplied to the multiplexer circuit 224. The run length counter 220 serves as a circuit for counting a run length of "0". The run length counter 220 supplies a number NNNN of zeros between the significant coefficients except for "0" to the Huffman encode circuit 222. The Huffman encode circuit 222 encodes the run length NNNN of zeros and the group number SSSS of the significant coefficient into variable length data in accordance with an AC Huffman table 223. The AC Huffman code is supplied to the multiplexer circuit 224.

The multiplexer circuit 224 multiplexes the DC Huffman code, the AC Huffman code, and the additional bit of one block (i.e., $8 \times 8$ input pixels), so that compressed image data is output from a signal line 104.

The compressed data output from the signal line 104 is stored in a memory. The compressed data is expanded in the read mode, so that the capacity of the memory can be reduced.

In the above embodiment, the quantization coefficient of the quantizer 213 is controlled to control the amount of finally coded data.

That is, when the quantization step is increased, the output level of the DCT circuit 212 which is divided by this quantization step is lowered. The value of the quantized AC coefficient is then reduced, and the frequency of appearance of "0"s is increased. Therefore, the amount of Huffman coded data can be relatively small.

According to this embodiment, as described above, optimal color image communication can be performed by the following operations:

(1) Since the apparatus comprises the means for transmitting a color expression form, a color expression form and color image data are transmitted in color image data transmission.

(2) Since the apparatus comprises the means for transmitting a color expression form, a compatible color expression form can be transmitted in color image data reception.

(3) Since the apparatus comprises the means for receiving a compatible color expression form from the receiver and the means for converting the color expression form in accordance with the compatible color expression form, color image data can be transmitted with the color expression form compatible with the receiver.

(4) Since the apparatus comprises the means for receiving a color expression form sent from the transmitter and the means for converting the color expression form in accordance with the received color expression form, color expression conversion of the received color image data can be performed as needed.

The information associated with the color expression form is transmitted and received between the transmitter and the receiver. A common color expression form can therefore be used, and optimal color image communication can be performed.

The elements of this embodiment are summarized as follows:

(1) A color expression form is notified to the receiver by transmitting the color expression form and color image data.

(2) A color expression form compatible with the receiver is notified to the transmitter.

(3) The transmitter receives a color expression form compatible with the receiver, and transmits color image data with the color expression form compatible with the receiver.

(4) The receiver receives a color expression form and color image data and converts the color expression form of the received color image data in accordance with the color expression form as needed.

The color expression forms of the present invention are not limited to those exemplified in FIG. 2, but other color expression forms may be used. The RGB expression forms may be further classified into an NTSC-RGB form and RGB forms of other schemes.

As described above, according to the embodiments of the present invention, data representing a color expression form compatible with a destination apparatus is received, and the color expression form of the image data to be transmitted is controlled. Therefore, data having a color expression form incompatible with the receiver will not be transmitted.

What is claimed is:

1. A color image receiving apparatus comprising:
   first means for receiving color image data through a communication line from an image transmitter; and
   second means for transmitting data representing a compatible color expression form through said communication line to said image transmitter.

2. An apparatus according to claim 1, wherein the color expression form is a form expressing colors by R, G, and B components.

3. An apparatus according to claim 1, wherein the color expression form is a form expressing colors by L, a and b components.

4. An apparatus according to claim 1, wherein the color expression form is a form expressing colors by X, Y, and Z components.

5. An apparatus according to claim 1, wherein the received color image data is coded data, and further comprising means for expanding the coded color image data.

6. An apparatus according to claim 15, wherein the color image data is ADCT-coded data, and said expanding means decodes the ADCT-coded data.

7. A color image receiving apparatus comprising:
means for receiving data representing a color expression form from an image transmitter;
means for converting the color expression form of the color image data to a suitable color expression form for a color output device; and
means for controlling said converting means in accordance with the received image data representing the color expression form.

8. An apparatus according to claim 7, wherein the color expression form is a form expressing colors by R, G, and B components.

9. An apparatus according to claim 7, wherein the color expression form is a form expressing colors by L, a, and b components.

10. An apparatus according to claim 7, wherein the color expression form is a form expressing colors by X, Y, and Z components.

11. An apparatus according to claim 7, wherein said converting means includes a conversion table.

12. A color image transmitter apparatus comprising:
means for receiving data representing a compatible color expression form from an image receiver; and
means for controlling the color expression form of image data to be transmitted, in accordance with the received data representing the color expression form.

13. An apparatus according to claim 12, wherein the color expression form is a form expressing colors by R, G, and B components.

14. An apparatus according to claim 12, wherein the color expression form is a form expressing colors by L, a and b components.

15. An apparatus according to claim 12, wherein the color expression form is a form expressing colors by X, Y, and Z components.

16. An image transmitting method comprising:
storing color image data into a memory;
providing a plurality of destinations for the color image data; and
converting the color image data read from said memory into a plurality of suitable forms for each of said plurality of destinations.

17. A method according to claim 16, further comprising converting an image into color image data.

18. A method according to claim 16, wherein said memory is disc memory.

19. A method according to claim 16, wherein said plurality of forms includes R.G.B. form.

* * * * *

UNITED STATES PATENT AND TRADEMARK OFFICE
CERTIFICATE OF CORRECTION

PATENT NO. : 5,251,020
DATED : October 5, 1993
INVENTOR(S) : MITSUMASA SUGIYAMA

It is certified that error appears in the above-identified patent and that said Letters Patent is hereby corrected as shown below:

COLUMN 2

Line 26, "scanner unit" should read --scanner unit 1--.

COLUMN 3

Line 30, "unit" should read --unit 9--.

COLUMN 5

Line 24, "R/$\overline{W}$0" should read --R/$\overline{W}$--.
    Line 65, "($X_0$, $Y_1$, $Z_0$)," should read --($X_0$, $Y_0$, $Z_0$),--.

COLUMN 9

Line 16, "claim 15," should read --claim 5,--.

COLUMN 10

Line 22, "image transmitting" should read ----image signal transmitting--.

Signed and Sealed this

Tenth Day of May, 1994

Attest:

BRUCE LEHMAN

Attesting Officer      Commissioner of Patents and Trademarks